Aug. 31, 1965    J. E. KILLPATRICK    3,204,107
SIGNAL RESOLUTION INCREASING MEANS
Filed July 5, 1961                   2 Sheets-Sheet 2
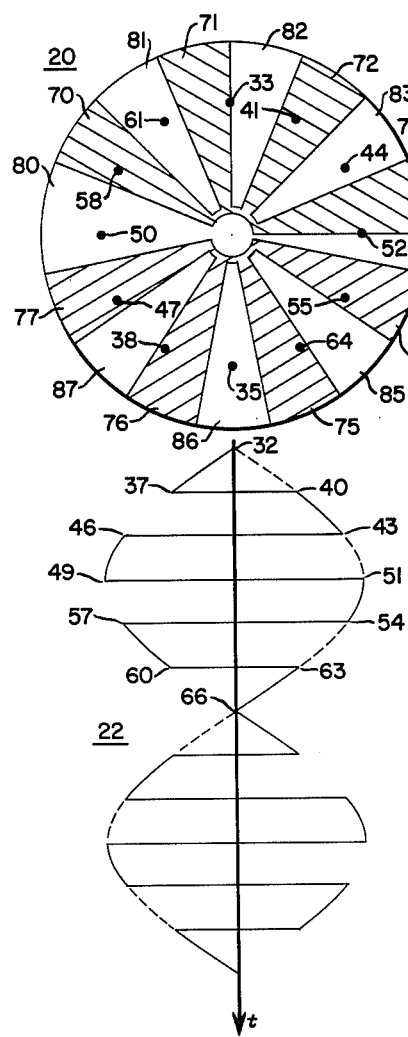
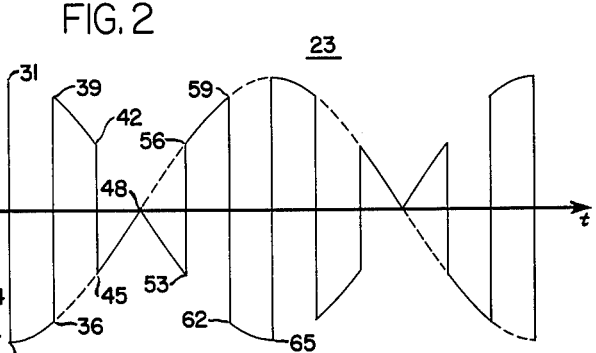
FIG. 2
FIG. 3
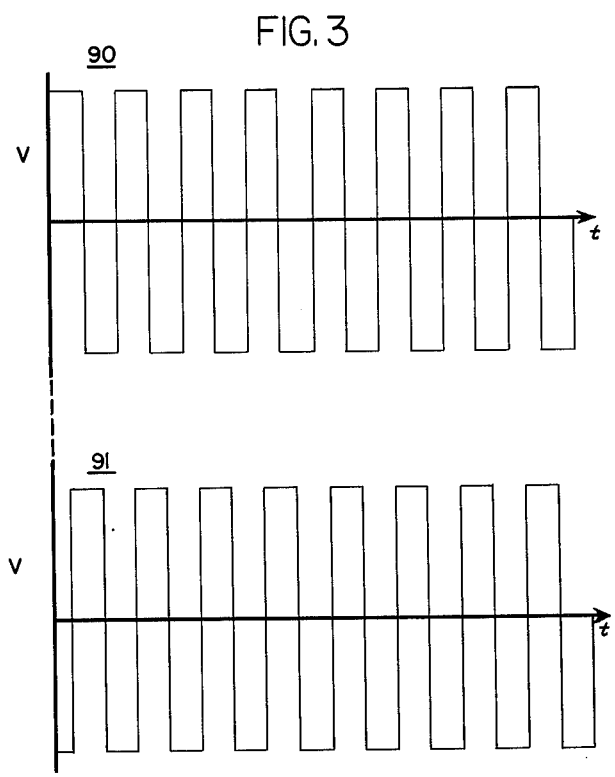
INVENTOR.
JOSEPH E. KILLPATRICK
BY Roger W. Jensen
ATTORNEY 3,204,107
SIGNAL RESOLUTION INCREASING MEANS
Joseph E. Killpatrick, Minneapolis, Minn., assignor to Honeywell Inc., Minneapolis, Minn., a corporation of Delaware
Filed July 5, 1961, Ser. No. 121,892
12 Claims. (Cl. 250—217)

This invention relates to a frequency multiplier and more specifically to a device for increasing the resolution of an output signal from condition responsive means.

In many fields devices are utilized which produce a pair of signals slightly out of phase to indicate the magnitude of such occurrences as movement and changes in conditions as well as the direction or sign of such occurrences. If the first signal leads the second signal by some phase angle, which could be approximately 90°, it is an indication that the movement or the changing condition is in a certain direction, for example increasing. If the second signal leads the first signal by an angle, which could again be 90° it is an indication that the movement or changing condition is in the other direction, in this example decreasing. Generally, the accuracy of these devices is dependent upon the number of cycles of signal that can be produced at the output for a given movement or change of condition. The present invention is a new and novel means for increasing the number of pulses which can be produced for a given movement or change of condition. The resolution of these devices is, thereby, greatly increased by the present invention.

In the present invention two signals approximately 90° out of phase, which may be produced by a condition responsive means or some similar device, are applied to chopping means. This chopping means chops the input signal at some frequency much higher than the frequency of the input signals. One of the chopped signals is then fed to the vertical deflection plates of a cathode ray tube and the other chopped signal is fed to the horizontal deflection plates of the cathode ray tube. If this is a normal type of cathode ray tube, well known to the art, two spots will appear on the fluorescent face of the tube 180 geometrical degrees apart. The spots will appear to be rotating in a circle and the speed of the rotation will depend upon the frequency of the signals being applied from the condition responsive means, since the spots will make a complete circle for each complete cycle applied to the cathode ray tube. It should be noted that this invention would work equally well if some other pattern, such as circles or lines, were used rather than spots.

A reticle made up of a plurality of wedge or pie-shaped passive and active sections, examples of which are light conducting and non-conducting, or transparent and opaque sectors, is attached to the face of the scope by some convenient means such as gluing. Thus, the light produced by the two revolving spots is modulated to produce a plurality of pulses per revolution. Pickoff means then utilize the information present at the face of the cathode ray tube to provide signals at a pair of output terminals in the following manner. Two light sensitive devices are then mounted so that the pulsating light from the face of the cathode ray tube impinges upon them. A filtering system or some other selection or blocking device is then interposed between the light sensitive devices and the face of the cathode ray tube so that the light from one half of the tube reaches one light sensitive device and the light from the other half of the tube reaches the other light sensitive device. In addition, the transparent wedge-shaped portions in one half of the reticle covering the face of the cathode ray tube are physically displaced or revolved a sufficient amount to cause the light pulses produced by the light spot in one half of the face of the tube to be substantially out of phase with the light pulses produced by the light spot in the other half of the tube. Because the light pulses are substantially out of phase the electric signals produced at the output of the photosensitive devices will be substantially out of phase and, thus, a sense of direction of rotation is imparted to the output by simply detecting which output signal is leading or lagging the other output signal.

Another embodiment of the invention for producing the same results comprises replacing the luminescent face of the cathode ray tube with a face that is composed of active and passive sections such as electrical conducting and non-conducting segments similar to the reticle covering the face in the previous explanation. All of the conducting sections in the upper half of the face are electrically connected together and connected to an output, and all of the conducting sections in the lower half of the face are electrically connected together and connected to an output. Thus, as the electron beam from the electron gun of the cathode ray tube sweeps past each conducting sector in its double circular sweep pulses are produced at the outputs. These conducting sectors are so placed, as described in the previous reticle, that the two output signals are approximately 90° apart and the signal which is leading determines the direction in which the electron beam is rotating.

It should be noted, that if the conducting sections and the alternate non-conducting sections in both the reticle and the base of the tube are of the same arcuate width, that is the included angles are equal, the output signal will be a square wave. However, two of the wedges must be of a slightly different arcuate width so that the conducting sections in the upper half of the face of the tube are offset from the conducting sections in the lower half of the face of the tube. That is, by making one non-conducting section of slightly less arcuate width than the normal sections and the other non-conducting section, diametrically opposite from the first non-conducting section, of a slightly larger arcuate width than the normal sections, the rest of the sections will be offset the desired amount, and the output signal will be out of phase by the amount of the offset.

It is a primary object of this invention to provide an improved control apparatus.

It is a further object of this invention to provide an improved frequency multiplier.

It is a further object of this invention to provide a means for improving the resolution of condition responsive means.

These and other objects of this invention will become apparent from the following description of a preferred form thereof and the accompanying specification, claims and drawings of which:

FIGURE 2 is a plot of the chopped input signals in relation to the face of the cathode ray tube;

FIGURE 3 is a curve of the output signals; and

FIGURE 4 is a block diagram of the present apparatus utilizing light sensing means.

Figure 1:
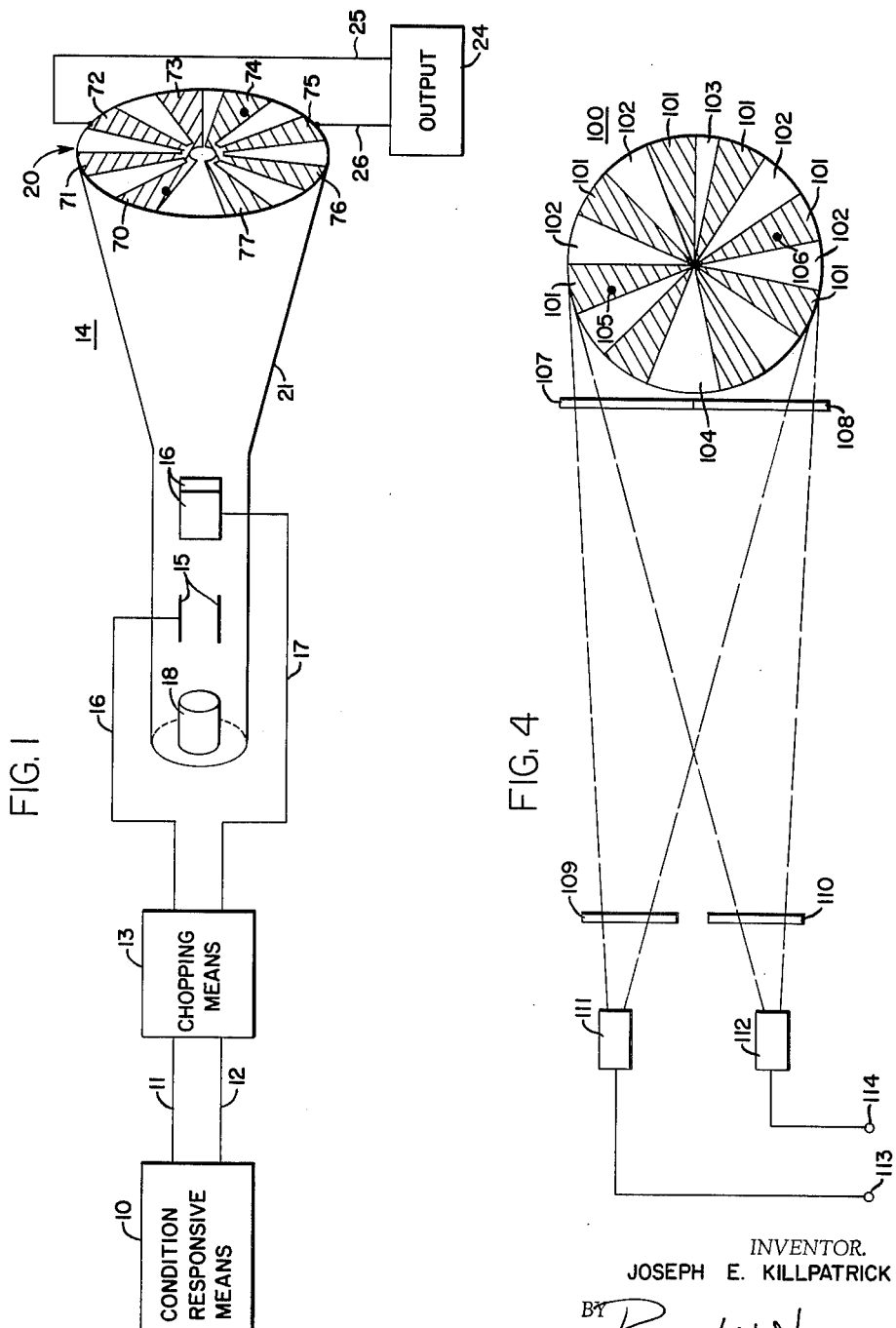
FIGURE 1 is a block diagram of the present apparatus utilizing electrical conducting and non-conducting sections for the face of the cathode ray tube.

In FIGURE 1, numeral 10 designates a condition responsive means. This condition responsive means may be any means responsive to a condition such as acceleration, temperature, or light. In particular this could be a photo pickoff similar to the one disclosed in the Aske and Glick copending application Serial No. 774,952, filed November 19, 1958, now Patent No. 3,041,883, and assigned to the same assignee as the present invention. Condition responsive means 10 is connected to a chopping means 13 by means of a pair of leads 11 and 12. Chopping means 13 may be any device for automatically reversing the phase of the input signals 180° periodically. This device could be comprised of relays, automatic switching, or some method of solid state switching utilizing transistors and diodes. In this preferred embodiment, condition responsive means 10 produces two signals approximately 90° out of phase. One signal is applied to chopping means 13 by means of lead 11 and the other signal is applied to chopping means 13 by means of lead 12. Chopping means 13 is so constructed that it chops each of these signals at a frequency much higher than the frequency of the input signal. The chopped signals from chopping means 13 are then applied to a cathode ray tube designated 14. Cathode ray tube 14 has an electrostatic deflection system for simplicity of explanation, but it should be noted that this device would work equally well with an electromagnetic deflection system.

Cathode ray tube 14, is comprised of a pair of vertical deflection plates 15, a pair of horizontal deflection plates 16, an electron gun 18, a scope face 20 and an envelope 21. An electrostatic deflection system is shown for simplicity, and to further simplify the drawing only one of each of the sets of plates 15 and 16 are shown connected. However, it should be noted that these deflection plates would be connected in the normal manner. Envelope 21 may be composed of any convenient non-conducting material, for example glass. The configuration of the envelope 21 shown in FIGURE 1 is not intended to impose any limitations upon this device, and it should be noted that any convenient configurations could be used.

One of the signals from the chopping means 13 is applied to the vertical deflection plates 15 by means of a lead 16. The other signal from chopping means 13 is applied to the horizontal deflection plates 16 by means of a lead 17.

When power is applied to the cathode ray tube 14, by means not shown, the electron gun 18 ejects a stream of highspeed electrons toward the face of the tube 20. As the electron beam from electron gun 18 passes through deflection plates 15 and 16, it is deflected in a manner well known to those skilled in the art. If a first sine wave is applied to vertical deflection plates 15 and a second sine wave 90° out of phase with the first sine wave is applied, simultaneously, to deflection plates 16, the electron beam from electron gun 18 will trace a circular path on scope face 20. The diameter and speed of the trace will depend upon the amplitude and frequency, respectively, of the applied sine wave. The direction of apparent rotation of the circular trace on scope face 20 will depend upon which sine wave is leading.

In FIGURE 2 scope face 20 is shown more fully and two representative chopped sine waves are graphically pictured. A first chopped sine wave 22 is shown as it would be applied to the horizontal deflection plates 16. A second chopped sine wave 23 which leads the chopped sine wave 22 by 90 electrical degrees is shown as it would be applied to the vertical deflection plates 15. It should be noted that the complete sine wave 22 as it is produced by condition responsive means 10 is shown dotted in FIGURE 2. This sine wave 22 is then chopped by chopping means 13 to produce the wave 22 shown in FIGURE 2 by the solid portion, and this solid portion is applied to horizontal deflection plates 16 by means of lead 17. Also, sine wave 23 is shown by the dotted line as it appears from condition responsive means 10 on lead 11. Chopping means 13 then chops the signal to produce the solid wave 23 shown in FIGURE 2 and this solid wave 23 is applied to vertical deflection plates 15 by means of lead 16.

The position of the point at which the electron beam from electron gun 18 hits the scope face 20 at any instant of time is proportional to the amplitude of the two sine waves 22 and 23 at that instant of time. The amount and direction of deflection of the electron beam from electron gun 18 and, thus, the point at which this beam strikes the scope face 20 is shown in FIGURE 2. The actual amplitude of sine waves 22 and 23 in relation to scope face 20 are shown. It should be noted that the number of times the sine waves are chopped is pictured as relatively low for simplicity. However, the frequency of the chopping would actually be much higher than the frequency of the sine wave. Each of the sine waves 22 and 23 oscillates about a reference line designated $t$. The amplitude or voltage of the wave is designated along an axis perpendicular to $t$, now shown. The reference axis $t$ may be the zero voltage line or it may be some other voltage and this will be strictly dependent upon the type of circuitry used with the cathode ray tube 14, as is well known to one skilled in the art. Reference line $t$ also designates time increasing in the direction of the arrow. The reference line $t$ for sine wave 22 and the reference line $t$ for sine wave 23 are actually the same reference line and are drawn in different positions in FIGURE 2 simply to denote the fact that they are applied to different deflection plates.

In FIGURE 2, at the instant of time when sine wave 23 has an amplitude denoted by point 31, sine wave 22 has an amplitude denoted by point 32. The resultant effect that these two deflection voltages have on the electron beam is to cause the electron beam to impinge the scope face at point 33. At this instant of time chopping means 13 reverses the phase of sine wave 23 giving the deflection voltage an amplitude denoted by point 34. Since sine wave 22 was at the reference value at this instant of time it is not changed by reversing the phase and therefore, remains at point 32. The resultant effect of the voltage at point 34 and the voltage at point 32 is denoted by point 35 which is the point on the scope face that the electron beam would strike.

It should be noted that the points 31 and 34 are not at the same instant of time. Actually, point 34 will be a slight amount of time later than point 31. This slight amount of time will be the amount of time which it takes chopping means 13 to react, or to switch the phase of sine wave 23. In this preferred embodiment this amount of time is made as small as practically possible, and will be small enough so that if the chopped signals are applied to a common oscilloscope two spots will appear simultaneously on the cathode ray tube exactly 180° out of phase. That is, point 33 and point 35 will appear on the face of the scope at the same time, although, in actuality they are a slight instant of time apart. As sine wave 23 travels from point 34 to point 36, sine wave 22 is traveling from point 32 to point 37 and, on scope face 20, the electron beam is traveling from point 35 to point 38. At this instant of time chopping means 13 operates and both sine waves change phase 180 electrical degrees. Thus, points 39 and 40 occur at the same instant of time and cause the electron beam to move from point 38 to point 41 on scope face 20. As sine wave 23 changes from point 39 to 42, sine wave 22 changes from point 40 to point 43. This causes the electron beam to travel from point 41 to point 44 on scope face 20. At the instant of time corresponding to points 42 and 43 chopping means 13 operates changing the phase of sine waves 22 and 23 180 electrical degrees to point 45 on sine wave 23 and point 46 on sine wave 22. This causes the electron beam from electron gun 18 to be directed at point 47 on scope face 20. Some instant of time later, sine wave 23 has moved from amplitude 45 to point 48 and sine wave 22 has moved from amplitude 46 to amplitude 49. This causes the electron beam to move from point 47 to point 50 on scope face 20. At the instant of time corresponding to points 48 and 49 chopping means 13 operates. Since point 48 on sine wave 23 is at the reference value changing the phase 180° does not alter the amplitude, however, changing the phase of sine wave 22 changes the amplitude from point 49 to point 51. This chopping or changing the amplitude of the two sine waves causes the electron beam of the cathode ray tube to be directed to spot 52 on scope face 20. An instant of time later sine wave 23 has changed from point 48 to point 53 and sine wave 22 has changed from point 51 to point 54. This change in the sine waves causes the electron beam to move from point 52 to point 55 on scope face 20. At the instant of time corresponding to point 53 and point 54 on sine waves 23 and 22 respectively, chopping means 13 operates. The operation of chopping means 13 produces the changes in sine waves 23 and 22 denoted by points 56 and 57 respectively. This change in sine waves 23 and 22 causes the electron beam of the cathode ray tube to be directed at point 58 on scope face 20. An instant of time later sine wave 23 has changed from point 56 to point 59 and sine wave 22 has changed from point 57 to point 60. This change in the sine waves 22 and 23 causes the electron beam to move from point 58 to point 61 on scope face 20. As chopping means 13 again operates, sine wave 23 is switched from point 59 to point 62 and sine wave 22 is switched from point 60 to point 63. This switching causes the electron beam of the cathode ray tube 14 to be directed at point 64 on scope face 20. An instant of time later sine wave 23 has moved from point 62 to point 65, sine wave 22 has moved from point 63 to point 66, and the electron beam has moved from point 64 to point 35 on the scope face 20. Thus, while 180 electrical degrees of the sine wave, or one half of the sine waves 22 and 23, have been applied to the horizontal and vertical deflection plates 16 and 15 the two positions or spots at which the electron beam strikes the face of the tube 20 have moved 180 geometrical degrees. That is, each of the spots has traversed a semicircle on the face 20 of the scope. As the remaining half waves of the two sine waves 23 and 22 are applied, the two spots on scope face 20 will continue along the other half of the semicircle and return to their original position. Although the chopping frequency is of such a value in this explanation as to cause the circle on scope face 20 to appear as a series of arcs it should be noted that in actuality the frequency will be high enough to make it appear that two spots are tracing an unbroken circle on scope face 20.

In this preferred embodiment scope face 20 is divided into a plurality of wedge-shaped sections 70 through 77. Wedge-shaped sections 70 through 77 are electrically conducting sections and may be fashioned in any convenient manner, such as silvering the inside of the face portion of the glass envelope of a standard cathode ray tube during construction. Wedge-shaped electrical conducting sections 70, 71, 72, and 73 are all electrically connected together at their points. Wedge-shaped electrical conducting sections and may be fashioned in any convenient together at their points and these four electrical conducting sections are insulated from the previous four electrical conducting sections. Each of the wedge-shaped electrical conducting sections 70 through 77 has the same arcuate width, that is, the distance which the electron beam of the cathode ray tube travels when it first touches the electrical conducting section on one side until it just leaves the electrical conducting section on the other side is the same distance for each of the electrical conducting sections.

Conducting wedge-shaped sections 70–77 are separated by a plurality of insulative or non-conducting sections 80 through 87. These sections could be produced by simply leaving the glass envelope of the cathode ray tube uncoated. Sections 81, 82, 83, 85, 86 and 87 all have the same arcuate width and this may be the same arcuate width as the electrical conducting sections. This embodiment is shown in FIGURE 2. When the face of the scope is constructed to these dimensions non-conducting section 84 will have an arcuate width one-half of the width of the electrical conducting sections and non-conducting section 80 will have an arcuate width one and one-half the arcuate width of the electrical conducting sections.

In FIGURE 1, wedge-shaped electrical conducting sections 70, 71, 72 and 73, which are connected together, are electrically connected to an output means 24 by means of a lead 25. Wedge-shaped electrical conducting sections 74, 75, 76, and 77, which are connected together electrically, are connected to output means 24 by means of a lead 26. Each time the electron beam from electron gun 18 touches one of the wedge-shaped electrical conducting sections an output will be produced on either lead 25 or lead 26. Also, each time a leading edge of a wedge-shaped electrically conducting section intercepts an electron beam an output of a definite amplitude will appear on either lead 25 or lead 26 and will remain at the definite amplitude until the electron beam is no longer making contact with the trailing edge of the electrical conducting section. Thus, a square wave output will appear. Since, as already explained in conjunction with FIGURE 2, two spots are revolving in a clockwise direction 180° apart geometrically two simultaneous square waves will be produced, one on lead 25 and one on lead 26. In this explanation sine wave 23 is leading sine wave 22 by 90° and, thus, the two spots are revolving in a clockwise direction. However, if sine wave 22 were leading sine wave 23 by 90° the two spots would be revolving in a counterclockwise direction. In this manner a sense of direction is imparted to the indicator. That is, when the signal from condition responsive means 10 on lead 11 is leading the signal on lead 12 the condition which the responsive means 10 is measuring is changing in one direction, and when the signal on lead 12 is leading the signal on lead 11 the condition is changing in the other direction.

In FIGURE 3 two square waves are shown, 90 and 91. For the clockwise rotation of the two spots, as already explained, waveform 90 would appear on lead 26 and waveform 91 would appear on lead 25. Both waveforms 90 and 91 are actually on the same time base and are of the same amplitude, however, they have been separated as shown in FIGURE 3 for simplicity. As can be seen in FIGURE 3, waveform 90 leads waveform 91 by 90 electrical degrees. This is accomplished by means of non-conducting sections 80 and 84. Because non-conducting section 80 is constructed one and one-half times as wide as the electrical conducting sections and non-conducting section 84 is constructed one-half times as wide as the conducting section the same effect is obtained as if conducting sections 70, 71, 72, and 73 were rotated clockwise one-half of a conducting section, or 90 electrical degrees. Since the two spots are revolving at positions 180° apart, by displacing the upper group of conducting sections 90 electrical degrees, when the electron beam is just entering a conducting section in the lower half of the scope the electron beam will be in the center of a non-conducting section in the upper half of the scope. This is shown more clearly in FIGURE 3 where it can be seen that waveform 90 is just beginning a positive square pulse while waveform 91 is in the center of a negative square pulse. If input waveform 22 were leading input waveform 23 the two spots on scope face 20 would be revolving in a counterclockwise direction and waveform 91 would leave waveform 90 by 90 electrical degrees. Thus, a sense of direction is imparted to the output waveforms. Output means 24 could thus be some configuration of a phase sensitive counter and the amount and direction of change of the condition sensed by the condition responsive means 10 would thus be indicated.

The configuration of scope face 20 shown in FIGURE 2 is simply the preferred embodiment. It is possible that many different proportions between the conducting and non-conducting sections could be arrived at, and this particular configuration is not intended to limit the invention in any way. However, in order to impart a sense of direction to the output signals, one signal must lead the other signal by a substantial amount. One conducting section and one non-conducting section of scope face 20, for example conducting section 71 and non-conducting section 82, will produce a complete wave as the electron beam sweeps across them. Thus, the two sections 71 and 82 cited in this example would constitute 360 electrical degrees. By constructing section 84 one quarter of the arcuate width of these two sections 71 and 82 it is 90 electrical degrees wide. Also, by constructing section 80 three quarters of the arcuate width of sections 71 and 82 it is 270 electrical degrees wide. In this manner the upper conducting sections are offset by 90 electrical degrees as is desired. It should be noted that the conducting sections can be of any size compared to the non-conducting sections and as long as a conducting section and a non-conducting section, other than non-conducting sections 80 or 84, are used one quarter of the total arcuate width will be 90 electrical degrees. It is not essential to the invention that non-conducting section 84 be exactly 90 electrical degrees wide since this is simply used for explanation. Any width that will produce a substantial phase shift between output waves 90 and 91 may be utilized in the present invention.

Another possible configuration of this invention is shown in FIGURE 4. In this configuration a normal or standard cathode ray tube is used, only the face of which is shown in FIGURE 4 and designated by numeral 100. The face of the cathode ray tube 100 is covered by a reticle comprised of transparent or light-conducting wedge-shaped segments and opaque or light non-conducting wedge-shaped segments. This reticle may be attached to the face of the tube by any convenient method such as gluing or actually painting it on the face of the tube. As can be seen in FIGURE 4, the reticle is constructed similar to the face of the tube in FIGURE 2, that is, the light conducting sections 101 are of the same size as the electrical conducting sections 70 through 77 in FIGURE 2, and the opaque or light non-conducting sections 102 in FIGURE 4 are of the same size as the electrical non-conducting sections 81, 82, 83, 85, 86 and 87 in FIGURE 2. Also, section 103 is slightly smaller than the conducting sections as is section 84 in FIGURE 2 and section 104 in FIGURE 4 is slightly larger than the conducting sections as is section 80 in FIGURE 2. The same theory and manner for determining the size of the wedges may be used in constructing this reticle as is used in constructing the face of the tube in FIGURE 2.

It should be noted that the cathode ray tube in FIGURE 4 is rotated 90° counterclockwise into the paper to more fully show the reticle and face of the tube. Two spots of light 105 and 106 are shown on the face of the tube. These spots of light are produced in a manner similar to that already discussed. That is, two signals from a condition responsive means are chopped by chopping means and sent to the vertical and horizontal deflection plates of the tube. Thus, two spots of light are produced revolving in a circle 180° apart and the direction of revolution is dependent upon the phase of the signals from the condition responsive means. In this particular configuration spots of light are produced because a standard cathode ray tube with a fluorescent face is utilized, whereas, in the previous discussion the spots were simply points at which the electron beam intersected the face of the tube.

The luminescent spots 105 and 106 on cathode ray tube face 100 will transmit light through a first set of filters 107 and 108 and a second set of filters 109 and 110, and this light will be sensed by a pair of photo sensors 111 and 112. These sensors in turn will produce electrical signals and apply them to an output means 113 and 114. Light filter 107 is a filter which allows only one color of light to pass. Filter 107 is so constructed that it covers approximately the upper half of the face of the tube 100. Light filter 108 is a filter which allows only light of another color to pass. This filter is so constructed that it covers the other half of tube face 100. Filters 107 and 108 are so mounted, by means not shown, that only the spot in the upper half of tube face 100 will transmit light through 107 and only the spot in the lower half of tube face 100 will transmit light through filter 108. Filter 109 is also a light filter which only passes one color of light, and this light may be either of the same color as that passed by filter 107 or that passed by filter 108. Light filter 110 also passes only one color of light and the color which this filter passes will be the color of the filters 107 or 108 which light filter 109 does not pass. Thus, the light transmitted by the spot in the upper half of tube face 100 will pass through filter 107 and either filter 109 or filter 110 to one of the photo sensors 111 or 112. For simplicity of explanation it may be assumed that the light passing through filter 107 also passes through filter 109 to photo sensing device 111. Therefore, the light from spot 106, or the spot in the lower half of tube face 100, will pass through light filter 108 and light filter 110 to photo sensor 112. It should be noted that each photosensor will pick up the light from only one half of the tube face and the light transmitted by the other half of the tube face will not affect it.

Since the transparent sections in the upper half of the tube face are offset by a substantial number of electrical degrees the light transmitted by the upper half of the scope face 100 will be out of phase with the light transmitted by the lower half of the tube face 100. Since the light is out of phase the electrical signals produced by photo sensors 111 and 112 will be out of phase, and the direction of rotation of spots 105 and 106 will determine which electrical output signal is leading.

Many methods will occur to those skilled in the art for blocking or retarding the light so that only the light from one half of the tube face 100 reaches one photo sensor and only the light from the other half of tube face 100 reaches the other photo sensor. The scheme described is simply one configuration and is not intended to limit the invention in any way.

Although the present invention was described with only a small number of wedge-shaped sections covering the face of the tube, it should be noted that the number of these sections could be greatly increased, thereby greatly increasing the number of pulses produced at the output of this device for each wave of signal input. In the present configuration FIGURE 3 shows eight complete cycles of output signal and it should be understood that these are produced by one complete cycle of input signal, or one revolution of the two spots on scope face 20. By increasing the number of wedges into which scope face 20 is divided many more output cycles per input wave could be produced.

It can be seen that this invention will greatly increase the resolution of any condition responsive means utilized in position 10. Any output device 24 which could only sense one pulse from condition responsive means 10, previously, will be capable of sensing one pulse from the present invention, which pulse is a mere faction of the previous pulse from condition responsive means 10. Thus, a great increase in resolution has been realized while at the same time the sense of direction information has been maintained. Also, the output is in single amplitude pulses, thereby facilitating the use of digital counters and logic circuits. Since this device can be constructed inexpensively, it has a great advantage over attempting to increase the resolution of a condition responsive means by increasing the limitations on the tolerances during construction of the condition responsive means. Also, this device can increase the resolution far greater than it would be possible to increase it by improved manufacturing processes.

What has been described is considered to be the preferred embodiment of this invention but it should be understood that various changes and modifications thereof may be made without departing from the spirit or scope of the invention as defined in the appended claims.

I claim:

1. Apparatus of the class described comprising: a cathode ray tube, the face of said tube being divided into a plurality of substantially equal portions each containing in a radial pattern a plurality of alternating non-conducting and conducting sector-shaped sections; input chopping means connected to said cathode ray tube having a plurality of input signals of substantially different phase applied thereto and operable to periodically reverse the phase of said input signals at a frequency higher than that of said input signals; and output means connected to said conducting sections having signals thereon of substantially higher frequency than said input signals.

2. Apparatus of the class described comprising: a cathode ray tube comprised of a face, a deflection system, and an electron gun, said face of said tube being divided into a plurality of substantially equal portions each containing in a radial pattern a plurality of alternating non-conducting and conducting sector-shaped sections; chopping means having an input and an output, said input of said chopping means adapted to have a pair of signals applied thereto and said chopping means operable to periodically reverse the phase of said pair of signals at a higher frequency than said pair of signals; means connecting said output of said chopping means to said deflection system of said cathode ray tube, said deflection system of said cathode ray tube causing said electron gun of said cathode ray tube to trace a plurality of paths on the face of said cathode ray tube when energized by signals from the output of said chopping means; output means connected to said conducting sections.

3. Apparatus of the class described comprising: a cathode ray tube, the face of said tube being divided into first and second substantially equal portions each containing in a radial pattern a plurality of passive and active sector-shaped sections, said active sections having a first arcuate width, a first passive section having an arcuate width substantially smaller than said first arcuate width, a second passive section having an arcuate width substantially larger than the first arcuate width and positioned diametrically opposite said first passive section, and the remainder of said passive sections having a second arcuate width; output means; and pickoff means for transferring information from said first portion and said second portion of said cathode ray tube face to said output means.

4. Apparatus of the class described comprising: a cathode ray tube, the face of said tube being divided into first and second substantially equal portions each containing in a radial pattern a plurality of passive and active sector-shaped sections, said active sections having a first arcuate width, a first passive section having an arcuate width substantially smaller than said first arcuate width, a second passive section having an arcuate width substantially larger than the first arcuate width and positioned diametrically opposite said first passive section, and the remainder of said passive sections having a second arcuate width; output means; pickoff means for transferring information from said first portion and said second portion of said cathode ray tube face to said output means; input means connected to said cathode ray tube; chopping means adapted to have applied thereto two alternating current signals substantially out of phase, said chopping means being characterized by chopping at a substantially higher frequency than the frequency of said alternating current signals; and means connecting said chopping means to said input means.

5. Apparatus of the class described comprising: a cathode ray tube, the face of said tube being divided into first and second substantially equal portions each containing a plurality of alternating electrically non-conducting and conducting wedge-shaped sections, the conducting sections having a first arcuate width, a first non-conducting section having substantially one-half the first arcuate width, a second non-conducting section having substantially one and one-half the first arcuate width and positioned diametrically opposite the first non-conducting section, and the remainder of said non-conducting sections having the first arcuate width; a first output means; means electrically connecting said conducting sections in said first portion to said first output means; a second output means; means electrically connecting said conducting sections in said second portion to said second output means; input means connected to said cathode ray tube; chopping means adapted to have applied thereto two signals substantially out of phase; and means connecting said chopping means to said input means.

6. Apparatus of the class described comprising: a cathode ray tube, the face of said tube being divided into first and second substantially equal portions each containing a plurality of alternating electrically non-conducting and conducting wedge-shaped sections, the conducting sections having a first arcuate width, a first non-conducting section having substantially one-half the first arcuate width, a second non-conducting section having substantially one and one-half the first arcuate width and positioned diametrically opposite the first non-conducting section, and the remainder of said non-conducting sections having the first arcuate width; a first output means; means electrically connecting said conducting sections in said first portion to said first output means; a second output means electrically connecting said conducting sections in said second portion to said second output means; input means comprising horizontal deflection means and vertical deflection means and connected to said cathode ray tube; chopping means adapted to have applied thereto two signals approximately 90° out of phase, said chopping means being characterized by chopping any input signals at a substantially higher frequency than the frequency of the applied signals; and means connecting said chopping means to said input means.

7. Apparatus of the class described comprising: a condition responsive means having a first and second output, said first and second output being approximately 90° electrically out of phase; chopper means having a first and second input and a first and second output; means connecting said first and second output of said condition responsive means to said first and second input of said chopper means respectively; a cathode ray tube having horizontal and vertical deflection means; means connecting said first output of said chopper means to said horizontal deflection means of said cathode ray tube; means connecting said second output of said chopper means to said vertical deflection means of said cathode ray tube, said first and second outputs of said chopper means causing two patterns of light to travel in a substantially circular pattern on said cathode ray tube, said two patterns of light being approximately 180° geometrically apart; a reticle attached to said cathode ray tube, said reticle being divided into first and second substantially equal portions each containing in a radial pattern a plurality of alternating opaque and transparent sector-shaped sections, the transparent sections having a first arcuate width, a first opaque section having substantially one half the first arcuate width, a second opaque section having substantially one and one-half the first arcuate width and positioned diametrically opposite the first opaque section, and the remainder of said opaque sections having the first arcuate width; a first color filter covering said first portion; a second color filter covering said second portion; a first and second light detector means; said first and second light detector means being mounted to receive light from said cathode ray tube; a filter having said first color mounted between said first light detector means and said cathode ray tube; a filter having said second color mounted between said second light detector means and said cathode ray tube, said filters operating to effectively block the light pattern on one-half of the face of said cathode ray tube from said first light detector means and the light pattern on the other half of the face of said cathode ray tube from said second light detector means; and output means attached to said first and second light detector means.

8. Apparatus of the class described comprising: a condition responsive means having a first and second output, said first and second output being approximately 90° electrically out of phase; chopper means having a first and second input and a first and second output; means connecting said first and second output of said condition responsive means to said first and second input of said chopper means respectively; a cathode ray tube having horizontal and vertical deflection means; means connecting said first output of said chopper means to said horizontal deflection means of said cathode ray tube; means connecting said second output of said chopper means to said vertical deflection means of said cathode ray tube, said first and second outputs of said chopper means causing two spots of light to travel in a substantially circular pattern on said cathode ray tube, said two spots of light being approximately 180° geometrically apart; a reticle attached to said cathode ray tube, said reticle being divided into first and second substantially equal portions each containing in a radial pattern a plurality of alternating light conducting and non-conducting sector-shaped sections, the conducting sections having a first arcuate width, a first non-conducting section having an arcuate width substantially less than the first arcuate width, a second non-conducting section having an arcuate width substantially greater than the first arcuate width and positioned diametrically opposite the first non-conducting section, and the remainder of said non-conducting sections having a second arcuate width; a first color filter covering said first portion; a second color filter covering said second portion; a first and second light detector means, said first and second light detector means being mounted to receive light from said cathode ray tube; a filter having said first color mounted between said first light detector means and said cathode ray tube; a filter having said second color mounted between said second light detector means and said cathode ray tube, said filters operating to effectively block the light spot on one-half of the face of said cathode ray tube from said first light detector means and the light spot on the other half of the face of said cathode ray tube from said second light detector means; and output means attached to said first and second light detector means.

9. Apparatus of the class described comprising: a condition responsive means having a first and second output, said first and second output being approximately 90° electrically out of phase; chopper means having a first and second input and a first and second output; means connecting said first and second output of said condition responsive means to said first and second input of said chopper means respectively; a cathode ray tube having horizontal and vertical deflection means; means connecting said first output of said chopper means to said horizontal deflection means of said cathode ray tube; means connecting said second output of said chopper means to said vertical deflection means of said cathode ray tube, said first and second outputs of said chopper means causing two spots of light to travel in a substantially circular pattern on said cathode ray tube, said two spots of light being approximately 180° geometrically apart; a reticle attached to said cathode ray tube, said reticle being divided into first and second substantially equal portions each containing in a radial pattern a plurality of alternating light conducting and non-conducting sector-shaped sections, the conducting sections having a first arcuate width, a first non-conducting section having substantially one-half the first arcuate width, a second non-conducting section having substantially one and one-half the first arcuate width and positioned diametrically opposite the first non-conducting section, and the remainder of said non-conducting sections having the first arcuate width; a first and second light detector means, said first and second light detector means being mounted to receive light from said cathode ray tube; a first light retarding means mounted between said first light detector means and said cathode ray tube; a second light retarding means mounted between said second light detector means and said cathode ray tube, said first and second light retarding means operating to effectively block the light spot on one-half of the face of said cathode ray tube from said first light detector means and the light spot on the other half of the face of said cathode ray tube from said second light detector means; and output means attached to said first and second light detector means.

10. Apparatus of the class described comprising: a condition responsive means having a first and second output, said first and second output being approximately 90° electrically out of phase; chopper means having a first and second input and a first and second output; means connecting said first and second output of said condition responsive means to said first and second input of said chopper means respectively; a cathode ray tube having horizontal and vertical deflection means; means connecting said first output of said chopper means to said horizontal deflection means of said cathode ray tube; means connecting said second output of said chopper means to said vertical deflection means of said cathode ray tube, said first and second outputs of said chopper means causing two spots of light to travel in a substantially circular pattern on said cathode ray tube, said two spots of light being approximately 180° geometrically apart; a reticle attached to said cathode ray tube, said reticle being divided into first and second substantially equal portions each containing in a radial pattern a plurality of alternating light conducting and non-conducting sector-shaped sections, the conducting sections having a first arcuate width, a first non-conducting section having an arcuate width substantially smaller than the first arcuate width, a second non-conducting section having an arcuate width substantially larger than the first arcuate width and positioned diametrically opposite the first non-conducting section, and the remainder of said non-conducting sections having a second arcuate width; a first and second light detector means, said first and second light detector means being mounted to receive light from said cathode ray tube; a first light retarding means mounted between said first light detector means and said cathode ray tube; a second light retarding means mounted between said second light detector means and said cathode ray tube, said first and second light retarding means operating to effectively block the light spot on one half of the face of said cathode ray tube from said first light detector means and the light spot on the other half of the face of said cathode ray tube from said second light detector means; and output means attached to said first and second light detector means.

11. Apparatus of the class described comprising: a cathode ray tube, the face of said tube being divided into first and second substantially equal portions each containing in a radial pattern a plurality of alternating non-conducting and conducting sector-shaped sections, the conducting sections having a first arcuate width, the non-conducting sections having a second, third and fourth arcuate width, said third arcuate width being substantially equal to one quarter of the sum of the first and second arcuate widths and said fourth arcuate width being substantially equal to three quarters of the sum of the first and second arcuate widths, a first non-conducting section having said fourth arcuate width, a second non-conducting section having said third arcuate width and positioned diametrically opposite the first non-conducting section, and the remainder of said non-conducting sections having said second arcuate width; a first output means; means connecting said conducting sections in said first portion to said first output means; a second output means; means connecting said conducting sections in said second portion to said second output means; input means connected to said cathode ray tube; chopping means adapted to have applied thereto two signals substantially out of phase; and means connecting said chopping means to said input means.

12. Apparatus of the class described comprising: a cathode ray tube, the face of said tube being divided into first and second substantially equal portions each containing in a radial pattern a plurality of alternating non-conducting and conducting sector-shaped sections, the conducting sections having a first arcuate width, the non-conducting sections having a second, third and fourth arcuate width, said third arcuate width being substantially equal to one quarter of the sum of the first and second arcuate widths and said fourth arcuate width being substantially equal to three quarters of the sum of the first and second arcuate widths, a first non-conducting section having said fourth arcuate width, a second non-conducting section having said third arcuate width and positioned diametrically opposite the first non-conducting section, and the remainder of said non-conducting sections having said second arcuate width; a first output means; means connecting said conducting sections in said first portion to said first output means; a second output means; means connecting said conducting sections in said second portion to said second output means; input means connected to said cathode ray tube; chopping means adapted to have applied thereto two signals substantially out of phase, said chopping means being characterized by chopping any input signals at a substantially higher frequency than the frequency of the applied signals; and means connecting said chopping means to said input means.

References Cited by the Examiner

UNITED STATES PATENTS

| | | | |
|---|---|---|---|
| 2,199,066 | 4/40 | Berstein | 250—217 |
| 2,214,019 | 9/40 | Gray | 315—21 |
| 2,344,679 | 3/44 | Crosby | 315—21 X |
| 2,365,476 | 12/44 | Knoop et al. | 315—21 X |
| 2,455,532 | 12/48 | Sunstein | 250—217 |
| 2,465,380 | 3/49 | Labin et al. | 315—21 X |
| 2,470,731 | 5/49 | Sziklai | 315—21 X |
| 2,512,655 | 1/50 | Kohler | 315—21 X |
| 2,524,789 | 10/50 | Greig et al. | 315—21 X |
| 2,528,187 | 10/50 | Sziklai et al. | 315—21 X |
| 2,534,372 | 12/50 | Ring | 315—21 X |
| 2,580,261 | 12/51 | Worcester | 315—21 X |
| 2,614,221 | 10/52 | Moll | 315—21 X |
| 2,901,663 | 8/59 | Nevius | 315—21 X |
| 2,931,912 | 4/60 | Macleish | 250—233 X |

FOREIGN PATENTS

| | | |
|---|---|---|
| 616,125 | 3/61 | Canada. |
| 67,062 | 6/48 | Denmark. |
| 971,671 | 2/59 | Germany. |

RALPH G. NILSON, *Primary Examiner.*

ROY LAKE, *Examiner.*